United States Patent
Cousins et al.

(10) Patent No.: US 7,574,597 B1
(45) Date of Patent: Aug. 11, 2009

(54) ENCODING OF SIGNALS TO FACILITATE TRAFFIC ANALYSIS

(75) Inventors: David B. Cousins, Barrington, RI (US); Craig Partridge, East Lansing, MI (US); W. Timothy Strayer, West Newton, MA (US); Rajesh Krishnan, Billerica, MA (US); Tushar Saxena, Lexington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1318 days.

(21) Appl. No.: 10/212,324

(22) Filed: Aug. 5, 2002

Related U.S. Application Data

(63) Continuation-in-part of application No. 10/167,620, filed on Oct. 19, 2001.

(60) Provisional application No. 60/339,288, filed on Oct. 26, 2001, provisional application No. 60/340,780, filed on Oct. 30, 2001, provisional application No. 60/355,573, filed on Feb. 5, 2002.

(51) Int. Cl.
*H04L 29/06* (2006.01)
*H04L 12/66* (2006.01)
*H04J 3/06* (2006.01)
*G06F 15/16* (2006.01)
*H04Q 11/00* (2006.01)

(52) U.S. Cl. .............. 713/160; 370/350; 370/354; 370/356; 370/358; 709/234

(58) Field of Classification Search ............ 726/22, 726/23
See application file for complete search history.

(56) References Cited

U.S. PATENT DOCUMENTS

| | | | |
|---|---|---|---|
| 4,625,081 A | 11/1986 | Lolito et al. | |
| 5,025,486 A * | 6/1991 | Klughart ............... | 340/3.1 |
| 5,140,585 A | 8/1992 | Tomikawa | |
| 5,426,513 A | 6/1995 | Scorse et al. | |
| 5,477,547 A | 12/1995 | Sugiyama | |
| 5,539,737 A | 7/1996 | Lo et al. | |
| 5,596,719 A | 1/1997 | Ramakrishnan et al. | |
| 5,610,905 A | 3/1997 | Murthy et al. | |

(Continued)

OTHER PUBLICATIONS

Forsythe, Keith W.; Monticciolo, Paul.; Sklar, J.R. "Spatial Adaptive Filtering for LPI Signal Detection". Pub. 1994. Proceedings of the 1994 Tactical Communications Conference. vol. 1. Digital Technology for the Tactical Communicator. Found on the World Wide Web at: http://ieeexplore.ieee.org/stamp/stamp.jsp?tp=&arnumber=472092 &isnumber=9946.*

(Continued)

*Primary Examiner*—Ayaz R Sheikh
*Assistant Examiner*—Jeremiah Avery
(74) *Attorney, Agent, or Firm*—Ropes & Gray LLP

(57) ABSTRACT

A system acquires information about communication among wired or wireless nodes [110, 210] in a network [100, 200] by intercepting chunks of data in the network by a wired or wireless tap [120, 220] located among the wired or wireless nodes [110, 210] in the network. Characteristic information [400] about the intercepted chunks of data may be obtained. The characteristic information may include times of arrival [410] of the chunks of data at the wired or wireless tap [120, 220] and identifiers of wired or wireless source nodes [420] that sent the chunks of data. At least one signal may be constructed to represent the characteristic information over time.

30 Claims, 7 Drawing Sheets

U.S. PATENT DOCUMENTS

| | | | |
|---|---|---|---|
| 5,649,108 A | 7/1997 | Spiegel et al. | |
| 5,687,095 A | 11/1997 | Haskell et al. | |
| 5,737,525 A | 4/1998 | Picazo et al. | |
| 5,751,967 A | 5/1998 | Raab et al. | |
| 5,793,762 A * | 8/1998 | Penners et al. | 370/389 |
| 5,838,919 A | 11/1998 | Schwaller et al. | |
| 5,859,979 A * | 1/1999 | Tung et al. | 709/228 |
| 5,881,237 A | 3/1999 | Schwaller et al. | |
| 5,946,308 A | 8/1999 | Dobbins et al. | |
| 5,959,995 A | 9/1999 | Wicki et al. | |
| 5,999,563 A * | 12/1999 | Polley et al. | 375/222 |
| 6,014,087 A | 1/2000 | Krishnakumar et al. | |
| 6,021,158 A * | 2/2000 | Schurr et al. | 375/211 |
| 6,023,563 A | 2/2000 | Shani | |
| 6,092,039 A | 7/2000 | Zingher | |
| 6,104,696 A | 8/2000 | Kadambi et al. | |
| 6,151,390 A * | 11/2000 | Volftsun et al. | 379/229 |
| 6,154,844 A * | 11/2000 | Touboul et al. | 726/24 |
| 6,195,622 B1 | 2/2001 | Altschuler et al. | |
| 6,219,788 B1 * | 4/2001 | Flavin et al. | 713/194 |
| 6,233,242 B1 | 5/2001 | Mayer et al. | |
| 6,237,007 B1 | 5/2001 | Brown | |
| 6,243,361 B1 | 6/2001 | McMillen et al. | |
| 6,246,684 B1 * | 6/2001 | Chapman et al. | 370/394 |
| 6,256,306 B1 | 7/2001 | Bellenger | |
| 6,269,330 B1 | 7/2001 | Cidon et al. | |
| 6,279,113 B1 * | 8/2001 | Vaidya | 726/23 |
| 6,308,218 B1 | 10/2001 | Vasa | |
| 6,308,220 B1 | 10/2001 | Mathur | |
| 6,321,338 B1 | 11/2001 | Porras et al. | |
| 6,434,624 B1 | 8/2002 | Gai et al. | |
| 6,442,139 B1 | 8/2002 | Hosein | |
| 6,446,131 B1 | 9/2002 | Khansari et al. | |
| 6,449,255 B1 | 9/2002 | Waclawsky | |
| 6,453,345 B2 | 9/2002 | Trcka et al. | |
| 6,473,858 B1 * | 10/2002 | Shimomura et al. | 713/150 |
| 6,484,203 B1 | 11/2002 | Porras et al. | |
| 6,510,154 B1 | 1/2003 | Mayes et al. | |
| 6,519,703 B1 | 2/2003 | Joyce | |
| 6,522,656 B1 | 2/2003 | Gridley | |
| 6,535,489 B1 | 3/2003 | Merchant et al. | |
| 6,546,017 B1 | 4/2003 | Khaunte | |
| 6,546,834 B1 | 4/2003 | Benuzzi | |
| 6,574,669 B1 | 6/2003 | Weaver | |
| 6,584,101 B2 | 6/2003 | Hagglund et al. | |
| 6,597,660 B1 | 7/2003 | Rueda et al. | |
| 6,597,661 B1 | 7/2003 | Bonn | |
| 6,601,208 B2 | 7/2003 | Wu | |
| 6,621,796 B1 | 9/2003 | Miklos | |
| 6,662,223 B1 | 12/2003 | Zhang et al. | |
| 6,665,317 B1 | 12/2003 | Scott | |
| 6,665,733 B1 | 12/2003 | Witkowski et al. | |
| 6,674,718 B1 | 1/2004 | Heddes et al. | |
| 6,681,029 B1 * | 1/2004 | Rhoads | 382/100 |
| 6,700,895 B1 | 3/2004 | Kroll | |
| 6,711,623 B1 | 3/2004 | Furukawa et al. | |
| 6,718,395 B1 | 4/2004 | Ziegler | |
| 6,721,355 B1 | 4/2004 | McClennon et al. | |
| 6,731,596 B1 | 5/2004 | Chiang et al. | |
| 6,735,702 B1 * | 5/2004 | Yavatkar et al. | 726/13 |
| 6,741,556 B1 | 5/2004 | Seddigh et al. | |
| 6,760,701 B2 | 7/2004 | Sharma et al. | |
| 6,775,392 B1 * | 8/2004 | Rhoads | 382/100 |
| 6,839,754 B2 | 1/2005 | Nowak et al. | |
| 6,850,989 B1 | 2/2005 | Lavian et al. | |
| 6,944,127 B1 | 9/2005 | Burchfiel et al. | |
| 6,950,404 B2 | 9/2005 | Pearl | |
| 6,958,977 B1 | 10/2005 | Mitrani et al. | |
| 6,977,942 B2 | 12/2005 | Raisanen | |
| 6,981,055 B1 | 12/2005 | Ahuja et al. | |
| 6,981,158 B1 | 12/2005 | Sanchez | |
| 6,985,722 B1 * | 1/2006 | Snelgrove et al. | 455/420 |
| 7,012,893 B2 | 3/2006 | Bahadiroglu | |
| 7,065,482 B2 | 6/2006 | Shorey et al. | |
| 7,089,428 B2 | 8/2006 | Farley et al. | |
| 7,095,753 B1 | 8/2006 | Milliken et al. | |
| 7,127,396 B2 | 10/2006 | Chu et al. | |
| 7,170,860 B2 | 1/2007 | Partridge et al. | |
| 7,180,908 B2 | 2/2007 | Valavi et al. | |
| 7,200,105 B1 | 4/2007 | Milliken et al. | |
| 7,200,656 B1 | 4/2007 | Cousins | |
| 7,218,736 B1 * | 5/2007 | Nishimura et al. | 380/201 |
| 7,263,479 B2 | 8/2007 | Cousins | |
| 7,283,475 B2 | 10/2007 | Fortin et al. | |
| 7,318,105 B1 | 1/2008 | Bongiovanni et al. | |
| 2002/0032871 A1 | 3/2002 | Malan et al. | |
| 2002/0039371 A1 | 4/2002 | Hedayat et al. | |
| 2002/0049985 A1 | 4/2002 | Olshansky et al. | |
| 2002/0080967 A1 | 6/2002 | Abdo et al. | |
| 2002/0095289 A1 | 7/2002 | Chu et al. | |
| 2002/0112060 A1 | 8/2002 | Kato | |
| 2002/0136183 A1 | 9/2002 | Chen et al. | |
| 2002/0150102 A1 | 10/2002 | Janko et al. | |
| 2003/0008622 A1 | 1/2003 | Fernandez-Corbaton et al. | |
| 2003/0023918 A1 | 1/2003 | Wu | |
| 2003/0028662 A1 | 2/2003 | Rowley et al. | |
| 2003/0041165 A1 | 2/2003 | Spencer et al. | |
| 2003/0097439 A1 | 5/2003 | Strayer et al. | |
| 2003/0097595 A1 | 5/2003 | Partridge et al. | |
| 2003/0145110 A1 | 7/2003 | Ohnishi et al. | |
| 2003/0182431 A1 | 9/2003 | Sturniolo et al. | |
| 2004/0037561 A1 | 2/2004 | Guild et al. | |
| 2004/0057376 A1 | 3/2004 | Sasvari et al. | |
| 2004/0203383 A1 | 10/2004 | Kelton et al. | |
| 2004/0203764 A1 | 10/2004 | Hrastar et al. | |
| 2005/0198504 A1 | 9/2005 | Smith | |
| 2005/0246165 A1 | 11/2005 | Pettinelli et al. | |
| 2005/0286414 A1 | 12/2005 | Young et al. | |
| 2006/0067245 A1 | 3/2006 | Pearl | |

OTHER PUBLICATIONS

Boufaden et al., "Topic Segmentation: A First Stage to Dialog-Based Information Extraction," Department of Computer Science and Operations Research, University of Montreal, Quebec, Canada, 7 pages.

Guerin et al., "A Unified Approach to Bandwidth Allocation and Access Control in Fast Packet-Switched Networks," IEEE INFOCOM, pp. 1-12, (1992).

Hazen et al., "Recent Improvements in an Approach to Segment-Based Automatic Language identification," Spoken Language Systems Group, Laboratory for Computer Science, Massachusetts Institute of Technology, Cambridge, MA, 4 pages.

Parekh, A.K., "A Generalized Processor Sharing Approach to Flow Control in Integrated Services Networks," MIT Ph.D. Thesis, (Feb. 1992).

Ramus et al., "Language Identification with Suprasegmental Cues: A Study based on Speech Resynthesis," Journal of the Acoustical Society of America, 105(1):512-521, (1999).

Savage et al., "Practical Network Support for IP Traceback," Department of Computer Science and Engineering, University of Washington, Seattle, WA, 12 pages.

Schwartz et al., "Smart Packets: Applying Active Networks to Network Management," ACM Transaction on Computer Systems, 18(1):67-88, (2000).

Tagliaferri et al., "Hybrid Neural Networks for Frequency Estimation of Unevenly Sampled Data," IEEE, pp. 975-979, (1999).

Turner, Jonathan, "New Directions in Communications (or Which Way to the Information Age?)," IEEE Communications Magazine, 24(10):8-15, (Oct. 1986).

Co-pending U.S. Appl. No. 09/881,145, filed Jun. 14, 2001.

Co-pending U.S. Appl. No. 10/044,073, filed Jan. 11, 2002.
Patrice Abry, Richard Baraniuk, Patrick Flandrin, Rudolf Riedi and Darryl Veitch, "Multiscale Nature of Network Traffic," IEEE Signal Processing Magazine, May 2002, pp. 28-46.
Olivier Cappé, Eric Moulines, Jean-Christophe Pesquet, Athina Petropulu and Xueshi Yang, "Long-Range Dependence and Heavy-Tail Modeling for Teletraffic Data," IEEE Signal Processing Magazine, May 2002, pp. 14-27.
Kay, S.M. "Modern Spectral Estimation: Theory & Application," Prentice Hall, (1988).
Oppenheim et al., "Discrete-Time Signal Processing," Prentice Hall, (1989).
Partridge, C., "Gigabit Networking," Addison-Wesley, (1994).

Dr. Jeffrey J. Gosper, "Floyd-Warshall All Pairs Shortest Pairs Algorithm," Brunei University, 1998, 5 pages.
Gordon, J., "Parto Process as a model of self-similar packet traffic," May 1995 IEEE, pp. 2232-2236.
Office Action in U.S. Appl. No. 10/359,995 issued on Dec. 3, 2007.
Partridge, C., "Gigabit Networking", Addison-Wesley, 1994.
Sanchez, Luis, et al., "Method and Apparatus for Tracing Packets", U.S. Appl. No. 09/881,074, filed Jun. 14, 2001 (34 pages).
Strayer, William, "Systems and Methods for Dynamically Altering Traffic Timing to Mimic Other Traffic Streams," U.S. Appl. No. 10/454,899, filed Jun. 5, 2003 (33 pages).

* cited by examiner

| 410 Time | 420 Source Node | 430 Dest. Node | 440 Type | 450 Size/Duration |
|---|---|---|---|---|
| 50.001643 | 2 | 1 | ack | 40 |
| 50.005243 | 1 | 2 | tcp | 1000 |
| 50.012309 | 2 | 1 | ack | 40 |
| 50.015909 | 1 | 2 | tcp | 1000 |
| 50.022976 | 2 | 1 | ack | 40 |
| 50.026576 | 1 | 2 | tcp | 1000 |
| 50.033643 | 2 | 1 | ack | 40 |
| 50.037243 | 1 | 2 | tcp | 1000 |
| 50.044309 | 2 | 1 | ack | 40 |
| 50.047909 | 1 | 2 | tcp | 1000 |
| 50.054976 | 2 | 1 | ack | 40 |
| 50.058576 | 1 | 2 | tcp | 1000 |
| 50.060309 | 2 | 1 | ack | 40 |
| 50.063909 | 1 | 2 | tcp | 1000 |
| 50.070976 | 2 | 1 | ack | 40 |
| 50.074576 | 1 | 2 | tcp | 1000 |
| 50.081643 | 2 | 1 | ack | 40 |
| 50.085243 | 1 | 2 | tcp | 1000 |
| 50.092309 | 2 | 1 | ack | 40 |
| 50.095909 | 1 | 2 | tcp | 1000 |
| 50.102976 | 2 | 1 | ack | 40 |

Fig. 4

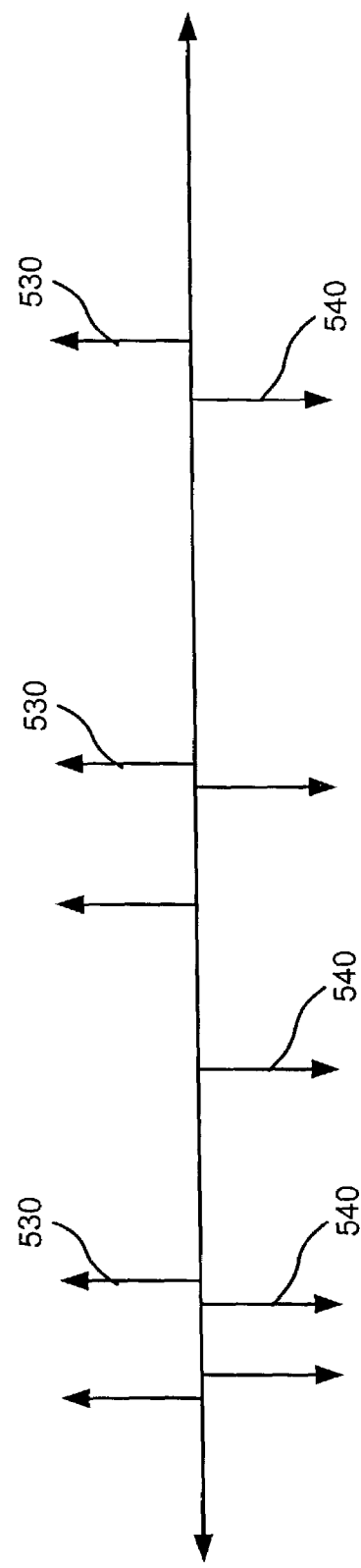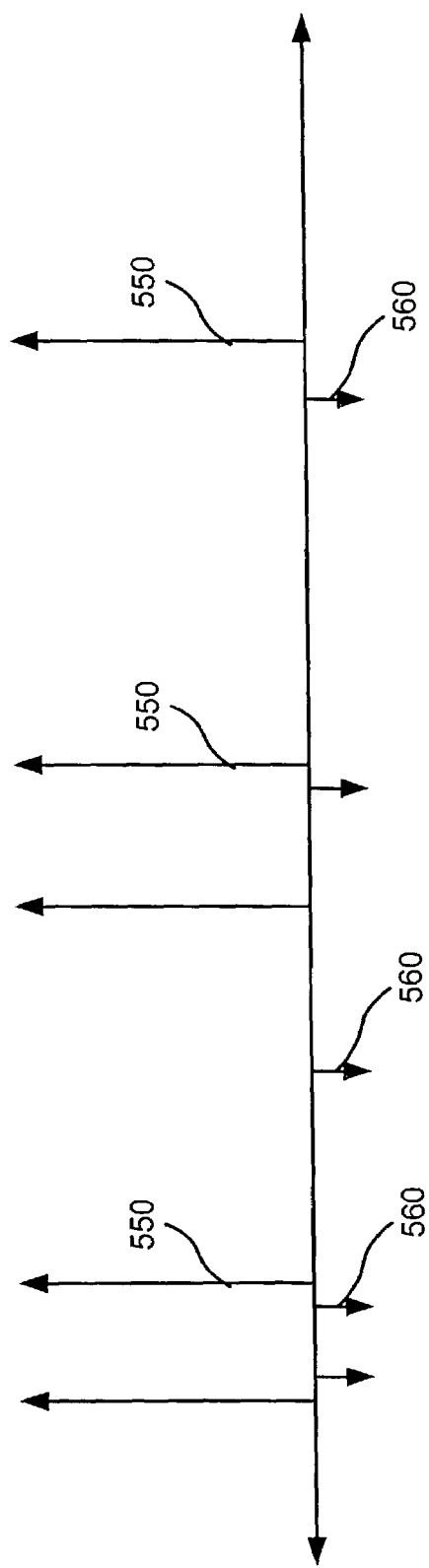

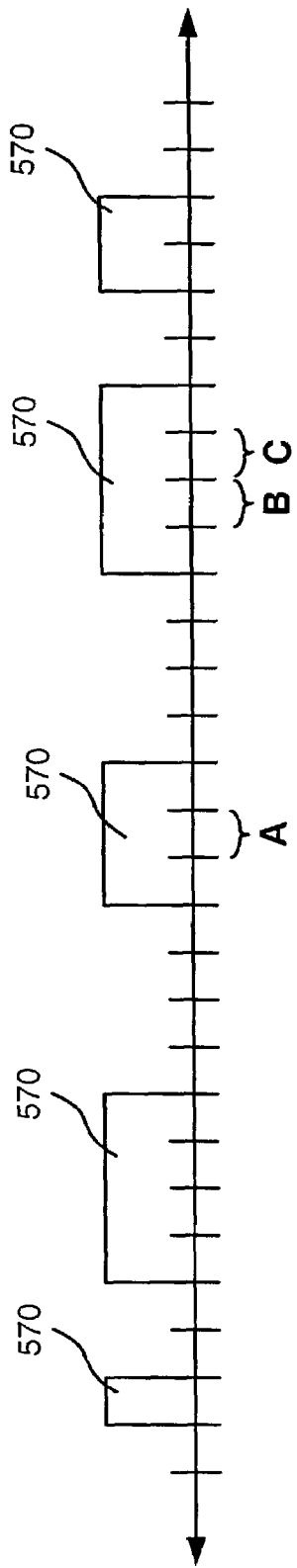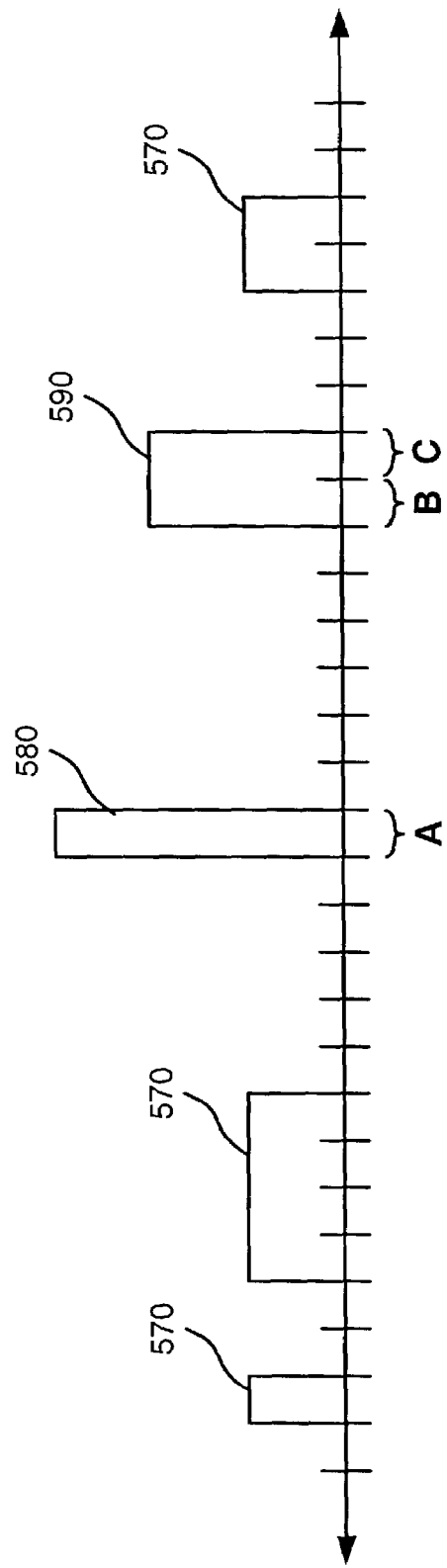

ENCODING OF SIGNALS TO FACILITATE TRAFFIC ANALYSIS

RELATED APPLICATION

This application claims the benefit of priority under 35 U.S.C. § 119(e) of provisional applications, Ser. Nos. 60/339,288, 60/340,780, and 60/355,573, filed Oct. 26, 2001, Oct. 30, 2001, and Feb. 5, 2002 respectively, the entire contents of which are incorporated herein by reference.

This application is also a continuation-in-part (CIP) under 37 C.F.R. § 1.53(b) of application Ser. No. 10/167,620, filed Oct. 19, 2001, the entire contents of which are incorporated herein by reference.

GOVERNMENT INTEREST

The invention described herein was made with government support. The U.S. Government may have certain rights in the invention, as provided by the terms of contract No. MDA972-01-C-0080, awarded by the Defense Advanced Research Projects Agency (DARPA).

BACKGROUND OF THE INVENTION

1. Field of the Invention

The present invention relates generally to communication networks, and more specifically, to the monitoring of data transmitted over such networks.

2. Description of Related Art

Communication networks typically include a number of interconnected communication devices. Connections among the devices in some communication networks are accomplished through physical wires or optical links. Such networks may be referred to as "wired" networks. Connections among the devices in other communication networks are accomplished through radio, infrared, or other wireless links. Such networks may be referred to as "wireless" networks.

Communication messages (e.g., data packets) sent across communication networks may be intercepted. Intercepted messages may yield valuable information, and the process of intercepting and analyzing messages may be referred to as "traffic analysis." In general, traffic analysis seeks to understand something about the message traffic by observing the traffic and analyzing that traffic to extract information. To guard against unwanted traffic analysis, messages are typically encrypted. For example, both the content and the destination of a message could be obscured through encryption.

In some situations, however, it may still be desirable to monitor traffic flow over communication networks. Accordingly, there is a need to monitor traffic flow even when identifying information associated with the messages is encrypted.

SUMMARY OF THE INVENTION

Methods and systems consistent with the present invention address this and other needs by detecting chunks of data, determining characteristics of the detected chunks, and encoding the characteristics into one or more signals that are amenable to further processing.

In accordance with one purpose of the invention as embodied and broadly described herein, a method of acquiring information about communication among nodes in a network may include intercepting chunks of data in the network by a tap located among the nodes in the network. Characteristic information about the intercepted chunks of data may be obtained. The characteristic information may include times of arrival of the chunks of data at the tap and identifiers of source nodes that sent the chunks of data. At least one signal may be constructed to represent the characteristic information over time.

In another implementation consistent with the present invention, a method of acquiring information about communication among nodes in a network may include intercepting chunks of data in the network by a tap located among the nodes in the network. Characteristic information about the intercepted chunks of data may be obtained. The characteristic information may include times of arrival of the chunks of data at the tap and durations of the chunks of data. At least one signal may be constructed to represent the characteristic information over time.

In a further implementation consistent with the present invention, a method of acquiring information about communication among nodes in a network may include intercepting chunks of data in the network by a tap located among the nodes in the network. Characteristic information about the intercepted chunks of data may be obtained. The characteristic information may include times of arrival of the chunks of data at the tap, durations of the chunks of data, and identifiers of source nodes that sent the chunks of data. At least one signal may be constructed to represent the characteristic information over time.

In yet another implementation consistent with the present invention, a computer-readable medium that stores instructions executable by one or more processors to perform a method for acquiring information about communication in a network may include instructions for detecting chunks of data in the network by a tap located among the nodes in the network. The medium may also include instructions for obtaining times of arrival of the chunks of data at the tap. The instructions may further cause identifiers of source nodes that sent the chunks of data to be obtained. Other instructions may cause at least one signal that represents the times of arrival of the chunks of data and the identifiers of source nodes over time to be constructed.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 illustrates an exemplary tracefile according to an implementation consistent with the principles of the invention;

FIG. 5C illustrates an exemplary scheme for the encoding of source node data;

FIG. 5D illustrates a scheme for encoding size/duration information into a signal;

FIG. 5E illustrates another scheme for encoding the size/duration information into a signal; and FIG. 5F illustrates an exemplary scheme for encoding simultaneous chunk arrivals into a signal.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Data encryption may hide the contents of packets (i.e., discrete units of data), but it does not obscure basic protocol mechanisms and dynamics. Some examples of these basic mechanisms may include the packet's source, destination, and the interpacket gaps caused by certain applications.

Methods and systems consistent with the principles of the invention detect chunks of data and determine characteristics of the detected chunks. The characteristics may be encoded into one or more signals that are amenable to further processing.

Exemplary Wired Network

Figure 1:
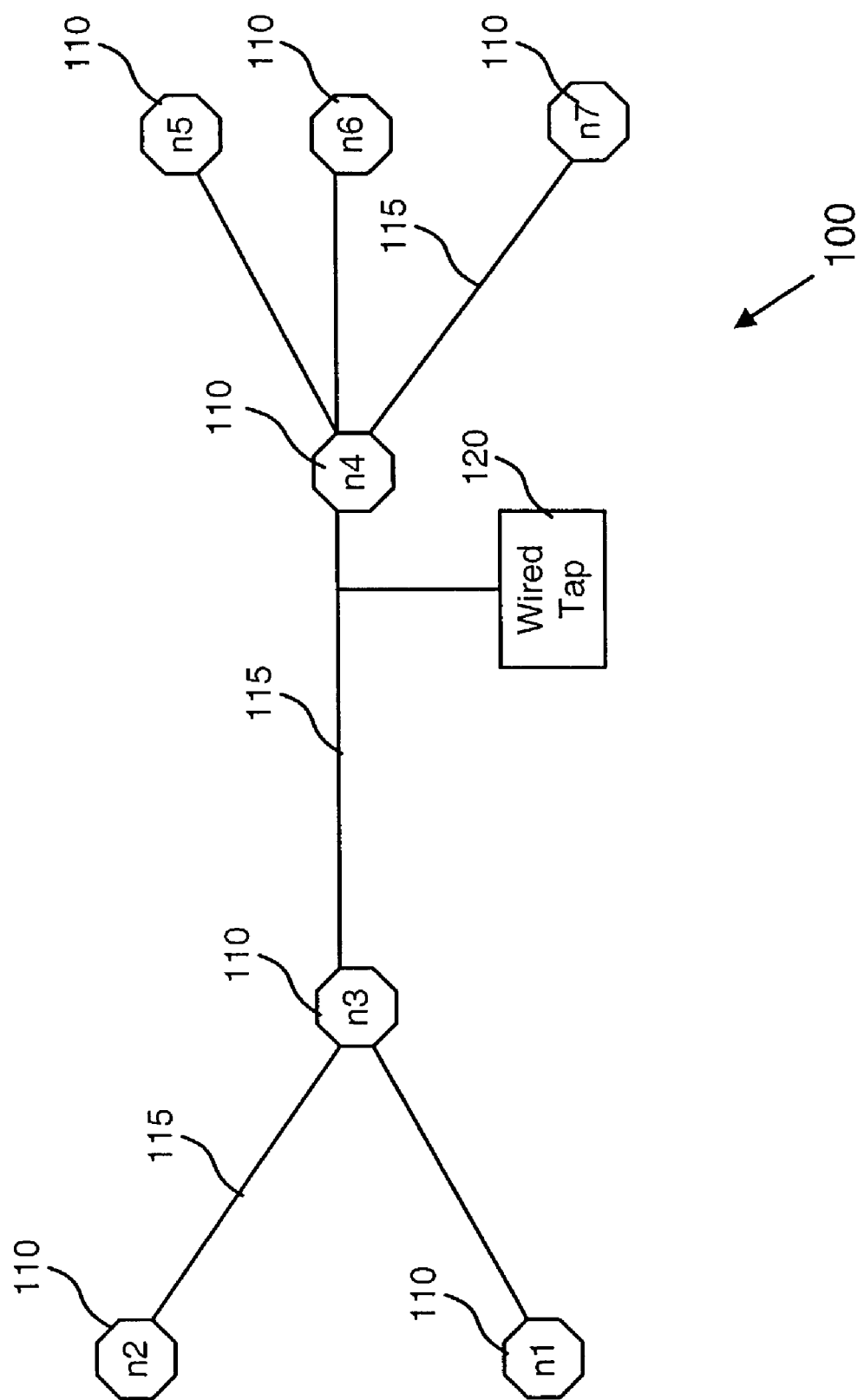
FIG. 1 is a diagram illustrating an exemplary wired network and tap according to an implementation consistent with the present invention.

FIG. 1 is a diagram illustrating an exemplary wired network 100 according to an implementation consistent with the present invention. The wired network 100 may include a number of network nodes 110 connected by a number of network links 115. The wired network 100 may also include one or more network taps 120. Although seven nodes 110 and one tap 120 are shown connected in a particular configuration, this is purely exemplary. Wired network 100 may include any number and configuration of nodes 110, links 115, and taps 120.

Network nodes 110 may be configured to send and receive information according to a communication protocol, such as TCP/IP. Although not specifically shown, some nodes 110 may be configured to provide a route for information to a specified destination. Other nodes 110 may be configured to send the information according to a previously-determined route. The network nodes 110 may communicate via discrete "chunks" of data (i.e., separate pieces of data that extend over a period of time) that are transmitted by "senders" 110. A chunk may be individually detectable or distinguishable (i.e., a listening device, such as tap 120, may determine when a chunk starts and ends). A chunk of data need not exactly correspond to a packet of data. A chunk may represent part of a packet (e.g., a fragment or an ATM cell of an AAL5 PDU), or multiple packets (e.g., two packets concatenated).

Chunks of data may be transmitted by "senders" 110. A sender 110 may be the most recent node 110 to transmit a particular chunk (e.g., node n3 in FIG. 1, if the tap 120 intercepts a chunk transmitted to node n4). The sender 110 (e.g., node n3) is not necessarily the node 110 that originated the chunk (e.g., node n1 in FIG. 1, continuing the previous example).

Network links 115 may include electronic links (e.g., wires or coaxial cables) and optical links (e.g., fiber optic cables). These links 115 may provide a connection between two nodes 110 (e.g., nodes n1 and n3). It may be possible to physically tap into these links 115 to observe the information carried on them.

Network tap 120 is a device that may intercept chunk transmissions on the network 100. The tap 120 may include a physical connection to a corresponding link 115 and circuitry to detect chunks of data on the link 115. The tap 120 may intercept chunks at a physical layer, a link layer, a network layer, or at higher layers of the network 100 being monitored. The layer at which interceptions occur is within the abilities of those skilled in the art, and may be chosen based on knowledge of, and access to, the network links 115. The tap 120 may include, for example, a transceiver for sensing the chunks of data and may also include other circuitry (e.g., clock circuitry) for determining times of arrival and duration of the chunks. The tap 120 may include a processor for computing any other information associated with the chunks, such as information contained within a header of the chunk of data (e.g., identity of a sending node and/or receiving node).

In the example of FIG. 1, tap 120 may observe traffic on the link 115 between nodes n3 and n4. Tap 120 may record information about all the chunks that it observes in a "tracefile."

The tracefile may contain a minimum amount of information for each observed chunk. For example, the information may include the time the chunk was seen and the identity of the sender 110 of the chunk. The identity of the sender 110 may include, for example, the IP address of an IPsec gateway, the upstream or downstream transmitter on the point-to-point link 115, or "the same sender 110 as the one that also sent these other chunks." If available, the tracefile may also include additional information about the length or duration of the chunk, the destination node 110, or any insight into the contents of the chunk. Other information that may be available is the location of the tap 120 along the link 115 relative to the nodes 110 at either end of the link 115.

Tap 120 may not capture all traffic on the link 115. For example, tap 120 may occasionally make an error and mistakenly believe it has seen a chunk when no chunk was sent (e.g., due to bit errors on wired network 100). If transmissions are missed, false transmissions are detected, or if a sender 110 is misclassified, these events may be viewed as adding noise to the signals generated by the tap 120. Other sources of noise in the signal generated by the tap 120 may include interference from other signals (e.g., packets belonging to another flow, or jitter in timing due to sharing of a bottleneck among multiple flows).

Tap 120 may listen passively and may not participate in the monitored network 100 at the MAC (or higher) layers. In some cases, for example with 802.3 LANs, it is possible for the tap 120 to snoop at the MAC layer and extract some information about higher layer protocols. In the case of SONET networks, however, little or no information may be available about the MAC or higher layer protocols. Such passive listening may also be referred to as covert information collection.

Although a single tap 120 is shown in FIG. 1, wired network 100 may contain many taps 120, which may be interconnected. Taps 120 may work independently using purely local information. Distributed algorithms may allow sharing of information among taps 120. In such a case, taps 120 may have a globally synchronized clock that allows information from multiple taps 120 to be combined. A clock resolution of the taps 120 may be finer than the data sampling resolution of the taps 120, so that information about transmissions (e.g., the start time, duration, inter-transmission gap, and even the presence of short transmissions) is not missed.

A tap 120 (or a network of taps 120) should store the transmissions that it detects for a sufficient amount of time. For example, the round-trip time of a transport layer flow cannot be determined if the history that may be stored at tap 120 is less than one roundtrip time. The total volume of data that is stored depends on the capacity of the link 115 and the maximum round-trip time of flows seen on the link 115. Taps 120 may assign a unique identifier to each sender 110, for example, based on the address of the IPsec gateway. Taps 120 in the network 100 may assign the same unique identifier to any given sender 110.

Exemplary Wireless Network

Figure 2:
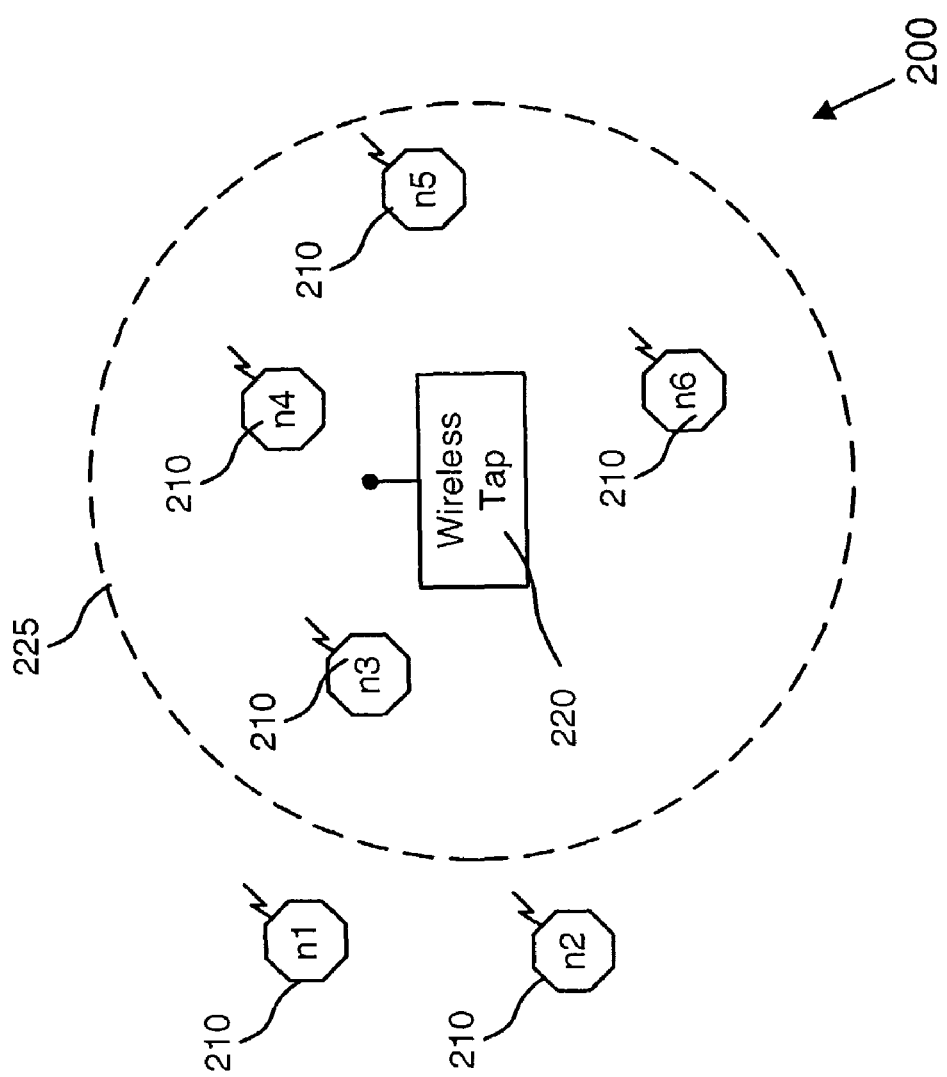
FIG. 2 is a diagram illustrating an exemplary wireless network and tap according to an implementation consistent with the present invention.

FIG. 2 is a diagram illustrating an exemplary wireless network 200 according to an implementation consistent with the present invention. The wireless network 200 may include a number of wireless nodes 210 and one or more wireless taps 220. The wireless nodes 210 may communicate via wireless transmission, either point-to-point or, more typically, broadcast transmission. The wireless tap 220 may have an associated area 225 in which it may be able to intercept wireless transmissions.

Although six nodes 210 and one tap 220 are shown in FIG. 2, this is purely exemplary. Wireless network 200 may include any number and configuration of nodes 210 and taps 220. The behavior and operation of the wireless nodes 210 and the wireless tap 220, where similar to the network nodes 110 and tap 120 described above, will not be repeated.

Wireless nodes 210 may communicate via chunks of data that are transmitted by wireless senders 210. Senders 210 may transmit using various types of wireless physical layers, such as terrestrial RF, satellite bands, and free space optical. Wireless nodes 210 may be, for example, radio routers or client radios in the wireless network 200.

Wireless tap 220 is a device that may intercept wireless transmissions on the network 200. Unlike tap 120, which may detect chunks of data only on a certain link 115, wireless tap 220 may observe some (potentially very large) fraction of the wireless spectrum, and thus may see transmissions from a wide range of wireless senders 220. As shown in FIG. 2, tap 220 may have a limited effective reception range. Dashed line 225 indicates an effective reception area through which tap 220 may receive communications from the nodes. As shown, nodes n1 and n2 are out of the effective reception area and will not be monitored by tap 220. Nodes n3-n6, which are within the range 225, may be monitored by tap 220. The tap 220 may include, for example, a transceiver for sensing the chunks of data and may also include other circuitry (e.g., clock circuitry) for determining times of arrival and duration of the chunks. The tap 220 may include a processor for computing any other information associated with the chunks, such as information contained within physical characteristics of the chunk of data (e.g., the identity of a sending or receiving node).

Wireless tap 220 also may record information about all the chunks that it observes in a tracefile. The tracefile may contain a minimum amount of information for each observed chunk. For example, the information may include the time the chunk was seen and the identity of the wireless sender 210 of the chunk. The identity of the wireless sender 210 may include, for example, an RF signature, the location of a radio transmitter 210, or "the same wireless sender 210 as the one that also sent these other chunks." If available, the tracefile may also include additional information about the length or duration of the chunk, the destination node 210, or any insight into the contents of the chunk. Other information that may be available is the geographic location of the tap 220, as determined by, for example, a global positioning system (GPS) receiver.

Tap 220 may not capture all traffic within its range 225. For example, reception on the wireless network 200 may be variable due to environment, noise, transmission power, or jamming such that a tap is unable to observe some transmissions. Furthermore, tap 220 may occasionally make an error and mistakenly believe it has seen a chunk when no chunk was sent (again due to noise on a wireless network). If transmissions are missed, false transmissions are detected, or if a wireless sender 210 is misclassified, these events may be viewed as adding noise to the signals generated by the wireless tap 220. Other sources of noise in the signal generated by the tap 220 may include interference from other signals (e.g., packets belonging to another flow or jitter in timing due to sharing of a bottleneck among multiple flows).

Tap 220 may listen passively and may not participate in the monitored network 200 at the MAC (or higher) layers. In some cases, for example with 802.11b LANs, it is possible for the tap 220 to snoop at the MAC layer and extract some information about higher layer protocols. In the case of tactical ad hoc networks, however, little or no information may be available about the MAC or higher layer protocols. Such passive listening may also be referred to as covert information collection.

Although a single tap 220 is shown in FIG. 2, wireless network 200 may contain many taps 220, which may be interconnected. In general, the number of wireless taps 220 placed in network 200 is determined by the desired coverage level of network 200. Taps 220 may work independently using purely local information. Distributed algorithms may allow sharing of information among taps 220. In such a case, wireless taps 220 may have a globally synchronized clock that allows information from multiple taps 220 to be combined. A clock resolution of the taps 220 may be finer than the data sampling resolution of the taps 220, so that information about transmissions (e.g., the start time, duration, inter-transmission gap, and even the presence of short transmissions) is not missed.

In the presence of mobile nodes 210 (for example, in ad hoc wireless networks or Mobile IP), taps 220 may, but need not, be mobile. Taps 220 may be placed randomly over a specified geographic area, or in a pattern. Alternately, taps 220 may be placed near respective senders 210. Wireless senders 210 can move into or out of range of one or more taps 220. Senders 210 typically may dwell in the range of one or more taps 220 long enough for transmissions to be observed, and the sources identified and recorded. Taps 220 may assign a unique identifier to each wireless sender 210, for example, based on their RF signature. Taps 220 in the network 200 may assign the same unique identifier to any given sender 210.

Exemplary System-Level Processing

Figure 3:
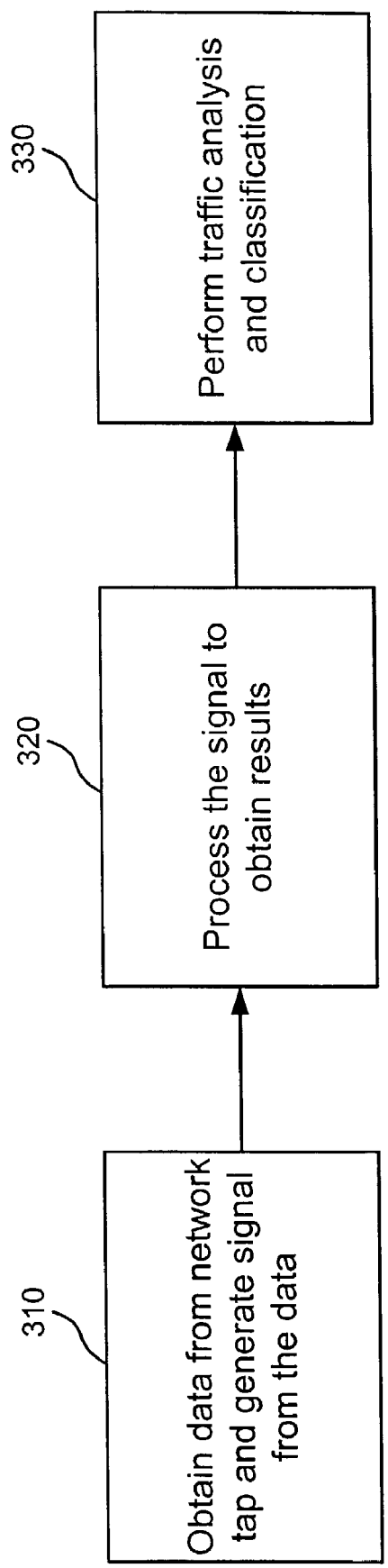
FIG. 3 is an exemplary diagram of traffic flow analysis and classification processing in the networks of FIGS. 1 and 2.

FIG. 3 is an exemplary diagram of traffic flow analysis and classification processing in networks 100 and 200. Processing may begin with a tap 120/220 obtaining data from its respective network 100/200. The tap 120/220 may also generate a signal from the data that it obtains [act 310].

Either the tap 120/220 or an associated (possibly central) processor (not shown) may perform processing on the signal produced by the tap 120/220 to produce results [act 320]. Such signal processing may produce identifiable signal traffic features, and may be computationally intensive. Those skilled in the art will appreciate, based on processing and networking requirements, whether to perform the signal processing at each tap 120/220 or other location(s).

The signal processing results may be further processed to analyze and classify the traffic on the network 100/200 [act 330]. Again, such traffic analysis processing may be performed by the tap 120/220 or another processor. Acts 310-330 may be broadly characterized as "signal generation," "signal processing," and "traffic analysis," respectively. These acts will be described in greater detail for certain implementations below.

Exemplary Signal Generation

Tracefile:

Once a tap 120/220 has generated a tracefile of tapped data, a signal may be generated (e.g., as in act 310) from the tracefile for further traffic analysis. A tracefile may represent discrete events, namely a sequence of events associated with different times. The tracefile may include other information (e.g., sender or recipient information) associated with the events.

FIG. 4 illustrates an exemplary tracefile 400 according to an implementation consistent with the principles of the invention. Tracefile 400 may include times of arrival 410 of chunks of data. Tracefile 400 also may include for each chunk arrival one or more of a source node of the chunk 420, a destination node of the chunk 430, a type of packet (e.g., packet data unit PDU) 440, and a size/duration of the chunk 450.

The time of arrival 410 may be based on when the tap 120/220 sensed the leading edge of a chunk of data. Although its information content may be limited, a signal may be encoded using solely time of arrival information 410. The presence of additional information (e.g., 420-450) may allow the generation of additional signals and/or signals with more robust information content.

One additional piece of information that the tap 120/220 may obtain is the size/duration 450 of a chunk of data. The tap may measure a length of time (i.e., duration) when data is present after it first sees the chunk. This duration 450 may be converted into a size (e.g., a certain number of bytes) by observing segmentation in the chunk of data. Alternately, the tap 120/220 may estimate the size 450 of a chunk of data by measuring a clock-time duration of when the chunk is present and by multiplying the duration by a bandwidth of the wired or wireless link over which the chunk travels.

Another piece of information that the tap 120/220 may obtain is identification of the source node 420 which sent the chunk of data. The identity (or address) of the source node 420 may be obtained, for example, even if the chunk of data is otherwise encrypted. A wireless tap 220 may obtain, for example, data including the time of arrival 410, the source node 420, and the size/duration 450 of chunks of data.

A further piece of information that the tap 120/220 may obtain is the identity (or address) of the destination node 430 to which the chunk of data is addressed. The identity of the destination node 430 may be obtained, for example, even if the chunk of data is otherwise encrypted. A wired tap 120 may obtain, for example, data including the time of arrival 410, the size/duration 450, the source node 420, and the destination node 430 of chunks of data. The wired tap 120 may obtain the latter two pieces of information, because it may know between which two nodes it is located.

Although designated as nodes "1" and "2" in FIG. 4, the addresses 420/430 of the source node and the destination node may be IP addresses, formatted according to a version of an internet protocol (e.g., IPv4). Alternately these addresses 420/430 may be, for example in the wired case, just an indication of which direction on the wire the received chunk of data was traveling.

Yet another piece of information that the tap 120/220 may obtain is the type 440 of the chunk of data. The type 440 (e.g., a TCP packet, an ACK message, a CBR packet, etc.) of chunk may be determined by examining the chunk itself. For example, unencrypted formatting data within the chunk may make the type 440 of chunk apparent. Alternately, the type 440 of chunk may be inferred from other information, such as the source node 420 or the size/duration 450 of the chunk.

The tap 120/220 may, if available, obtain other information from intercepted chunks of data, such as any field from an IP header associated with the chunk of data. Even if the body of the chunk is encrypted, the tap 120/220 may be able to determine a location of, and read information from, the header of the chunk. Similarly, the tap 120/220 may determine an IP security association value of the chunk. In a wireless network (e.g., 200), the tap 220 may also determine a signal strength of a chunk of data. Those skilled in the art will appreciate additional information in addition to the above examples may be directly or indirectly obtained by tap 120/220.

Signal Formation:

Signals may be formed from tracefiles (e.g., tracefile 400) by various techniques, which will be discussed below. In general, signals may be discrete-event data streams or files, and multiple items of information (e.g., 410-450) may be encoded within a single signal. In other implementations consistent with the principles of the invention, multiple signals may be generated from the same tracefile (e.g., one signal for arrivals from one node and another signal for arrivals from another node). Discrete-event data signals may facilitate later processing of those signals by a digital signal processor or general purpose computer. In still other implementations consistent with the principles of the invention, continuous signals may be constructed (e.g., by a digital-to-analog converter, digital logic combination, or similar device) to facilitate further signal filtering, truncation, or transformation that is performed in a non-discrete manner (e.g., by analog or digital electrical signal manipulation).

Approaches to signal generation may be generally grouped in non-uniform and uniformly-spaced methods. Under the former scheme, a non-uniform signal may be represented as a non-uniformly-spaced sequence of data. Data may include, for example, arrival times 410 and little other information. Non-arrivals need not be explicitly listed in such a signal, allowing for compact representation and storage.

Each chunk arrival time 410 may indicate the leading edge of the discrete events in the tap's tracefile, where time is quantized to the desired resolution. Only a limited number of signal processing algorithms, however, have been derived for non-uniform data (i.e., data that does not have a uniform sampling). One example of such a signal processing algorithm is a Lomb Periodogram, which can process non-uniformly sampled data sets.

Figure 5A:
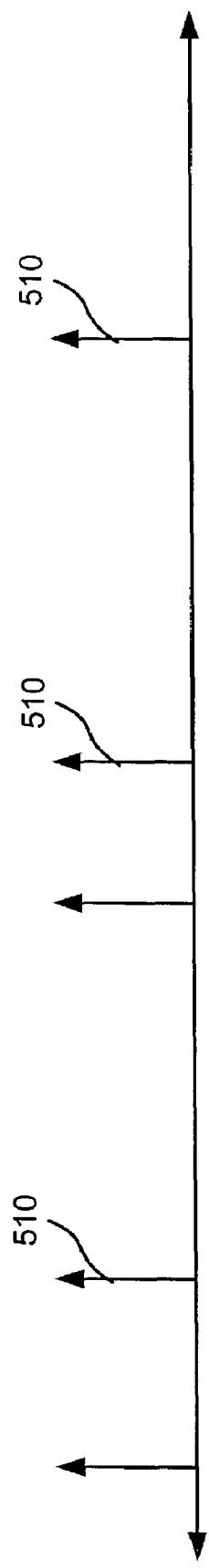
FIG. 5A conceptually illustrates a non-uniform signal that may represent tracefile data as non-uniformly-sampled data.

FIG. 5A conceptually illustrates a non-uniform signal, which represents tracefile data as a non-uniformly-sampled series of (possibly unit) impulses 510. The impulses 510 appear at the respective times that they were detected by the tap 120/220.

Another approach to producing a signal representing time of arrival of chunks is to pick an appropriate time quantization, to bin time into increments at that quantization, and to place a marker in the bins where a chunk was detected. This process may be termed "re-sampling," and it produces a uniformly sampled signal. Various schemes are available for determining into which time bin a given event will fall. These include a ceiling function (i.e., the bin below), a floor function (i.e., the bin above), a random function (e.g., a random or pseudo-random one of the adjacent bins), etc. Those skilled in the art will also appreciate various schemes for handling multiple arrival events that fall within the same time bin. One such scheme would be to uniquely spread the arrivals among a number of empty adjacent bins (not shown) to keep the multiple arrivals from being obscured. Due to errors introduced by the re-sampling, some information in the tracefile may be lost, but characteristic frequency and similarity information in the tracefile(s) may be maintained by re-sampling.

Figure 5B:
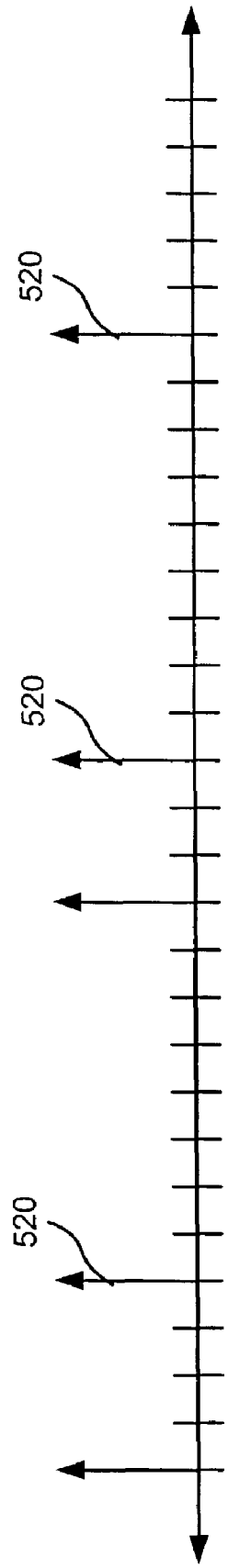
FIG. 5B conceptually illustrates uniform sampling of the same tracefile data used in FIG. 5A.

FIG. 5B conceptually illustrates uniform sampling of the same tracefile data used in FIG. 5A. Such uniform sampling of the data implies a sample time quantization period (shown as tick marks in FIG. 5B). It is known that for accurate signal reconstruction, the data should be sampled such that the sampling frequency is greater than twice the highest desired frequency content of the data (i.e., the Nyquist rate). Data may be encoded in each time increment as if it is a binary encoding: 1 (i.e., impulse 520) if a chunk is detected and 0 if no chunk is detected. Note that the impulses 520 result from a ceiling function being applied to the impulses 510 in FIG. 5A.

Both FIGS. 5A and 5B illustrate a single element of tracefile 400, namely the time of arrival 410. Additional information, however, may be encoded in a signal if such additional information is present in the tracefile. For example, if source node information 420 is present, times of arrival from two nodes may be differentiated using a sign function (i.e., sgn(x), where x is the node).

FIG. 5C illustrates the conceptual encoding of source node data 420 as the sign of the time of arrival data 410. Impulses 530 represent times of arrival of chunks from a first source node 420 (e.g., node 1 in FIG. 4). Similarly, negative impulses 540 represent times of arrival of chunks from a second source node 420 (e.g., node 2 in FIG. 4). In this exemplary manner, source node information 420 may be added to a signal.

Those skilled in the art will appreciate other ways of encoding source node information after reading this disclosure. For example, in one implementation consistent with the principles of the invention, the source node information 420 may be used to create different signals, each corresponding to a particular source node. With reference to FIG. 5C, a signal may be embedded with the impulses 530, and another signal may be embedded with the impulses 540.

If, for example, the duration 450 of each chunk is also known, several schemes may be used to encode this additional information in the signal. FIG. 5D illustrates one scheme for encoding the size/duration information 450 into a signal. Similar to FIG. 5C, impulses 550 represent times of arrival of chunks from a first source node 420 (e.g., node 1 in FIG. 4), and negative impulses 560 represent times of arrival of chunks from a second source node 420 (e.g., node 2 in FIG. 4). In contrast to FIG. 5C, the impulses 550 and 560 are weighted in proportion to their respective size/duration 450. That is, impulses 550 may be weighted to reflect a size/duration 450 of 1000 units as shown in FIG. 4, while impulses 560 may be weighted to reflect a size/duration 450 of 40 units.

FIG. 5E illustrates another scheme for encoding the size/duration information 450 into a signal. In such a scheme, all the time increments during which a chunk is present may be set to 1, with 0's during times when no chunks were visible. Such duration encoding would result in, for example, trains of adjacent impulses 570, which may also be represented as pulses of a certain duration by "connecting" the space between adjacent discrete impulses. For example, the leftmost pulse 570 in FIG. 5E may reflect a relatively short size/duration 450, while other pulses 570 may reflect longer sizes/durations 450.

Further, multiple chunks may be in transit and received by the tap 120/220 at substantially the same time (e.g., within the same sample time quantization period or "bin"). For ease of explanation, arrivals 410 that fall within the same sample bin will be referred to herein as "simultaneous," even though they may not, in fact, arrive at exactly the same time. In other words, the "simultaneous" times of arrival 410 may be very closely spaced. Several techniques are available for handling such chunk arrivals 410.

FIG. 5F illustrates an exemplary scheme for encoding simultaneous chunk arrivals into a signal. With reference to FIGS. 5E and 5F, three chunks may arrive in time increment A, and two chunks may arrive in each of increments B and C. In one approach that is shown in FIG. 5F, the presence of multiple chunks may be encoded by placing a count of the number of live chunks in each increment. In such a scheme, the number of chunks may be encoded as the strength of the impulse or pulse in a particular time increment. Hence, pulse 580 may have a magnitude of three to indicate three arrivals, and pulse 590 may have a magnitude of two for both increments B and C. The remainder of pulses 570 in FIG. 5F may have a unit magnitude.

Returning to FIG. 5E, another approach to keep simultaneous data from being obscured may be to jitter the time of the conflicting arrivals into adjacent empty sample times/bins. For example, of the three chunk arrivals in increment A, one may be placed in an empty time slot before increment A, and one may be placed in an empty time slot after increment A. Hence, instead of a single pulse 580 with a magnitude of three, this scheme produces three adjacent pulses 570 around increment A, each with a magnitude of one. Similarly, one of the two arrivals in increment B may be placed before increment B, and one of the two arrivals in increment C may be placed after increment C. Thus, instead of two pulses 590 with a magnitude of two, this scheme produces four adjacent pulses 570 around increments B and C, each with a magnitude of one.

Another approach to simultaneous arrivals 410 may be to generate distinct tracefiles for each sender. Multiple tracefiles may refine later traffic flow analysis by focusing on traffic from each sender separately.

In general, the pulses 570-590 may encode, in addition to their start time, at least two pieces of information in their 1) height and 2) width. For example, time-related information (e.g., transmit time or packet duration 450) may be encoded as the pulse width.

Further, the pulses 570-590 need not be rectangular as shown in FIGS. 5E and 5F. Pulses may be, for example, Gaussian pulses whose width and/or height may be proportional to multiple different pieces of information 410-450.

Other Signal Formation Schemes:

Other encoding schemes will be apparent to those skilled in the art, depending on the amount of available information in the tracefiles and the ability of later signal processing schemes to use the available information. Information in addition to time of arrival 410 may be encoded into signals from tracefiles 400. It should be noted that such additional information is not limited to items 420-450, but may include other data directly obtainable by taps 120/220. Further, the additional data may include data that is indirectly obtained (e.g., derived or calculated) from data directly obtained by taps 120/220. One example of such indirectly obtained data is inter-arrival time, which may be calculated from adjacent arrivals in the time of arrival data 410. Those skilled in the art will appreciate other directly and indirectly obtainable items of data from taps 120/220 after reading the disclosure herein.

Exemplary schemes may include binary, sign, real weighted, absolute value weighted, complex weighted, and multi-dimensional weighted schemes. Binary, sign, real weighted, and absolute value weighted methods may be referred to, collectively, as "single-valued" functions. By contrast, complex weighted and multi-dimensional weighted methods may be referred to as "multi-valued" functions.

An encoding function of a parameter x may be referred to in shorthand as f(x). The single-valued functions listed above will now be described in greater detail. For a binary scheme, $f(x)=0$ if $x<c$, where c is an arbitrary constant. Otherwise, $f(x)=1$. For a sign encoding scheme, $f(x)=sgn(x)$. This sign technique may retain polarity information, but may eliminate the actual value of the parameter x. In a real weighted scheme, $f(x)=cx$, where c is a constant that may be helpful in scaling the data. In an absolute value weighted scheme, $f(x)=c\,abs(x)$, where c is a constant.

The multi-valued functions listed above will now be described in greater detail. For a complex weighted function, $f(x,y)=ax+jby$ for constants a and b. Many signal processing techniques use complex arithmetic to preserve phase information. This complex weighted technique may preserve such phase information. For a multi-dimensional weighted technique, $f(x)=c*x$, where x is a vector formed by a number of data values at a given time t, and where c is a vector of weighting constants.

In addition to one-dimensional signal encoding, tracefile data 400 may also be encoded as two-dimensional signals. Data encoded as a two-dimensional signal may be processed with any of a rich arsenal of algorithms used for signal processing. Examples of two-dimensional signal processing algorithms may include, but are not limited to, periodogram processing, spectrum processing, cepstrum processing, coherence processing, wavelet processing, fractal processing, etc.

One way of generating a two-dimensional signal may be to process a time of arrival signal over periodic intervals to obtain a series of results (e.g., spectra, periodograms, cepstra, etc.). These results may be combined over time into a two-dimensional signal.

Another way of generating a two-dimensional signal may be to plot inter-arrival time vs. arrival time. For example, horizontal positions in an image x(k) may equal $(t_k-t_{k-1})$, the inter-arrival times. Vertical positions in the image y(k) may equal $t_k$, the arrival times. The intensity of points within the image z(k) may equal $f(x_k)$, a magnitude assigned to the arrival time impulse or pulse by one of the above-described schemes.

The above methods of generating signals from data collected by taps 120/220 are exemplary, and should not limit other methods of generating signals which may be implemented by those skilled in the art without undue experimentation.

Exemplary Signal Processing

Processing of signals (e.g., as in act 320) may be performed by techniques that are generally understood by those skilled in the signal processing arts. Various techniques may be used to extract, for example, periodic features of a signal. For non-uniformly sampled signals, Lomb periodograms may be used. For uniformly-sampled signals, Fourier-transform techniques or Cepstrum processing may be used to generate spectra or cepstra, respectively. These spectra or cepstra may be combined over time to form periodograms or cepstrograms.

Other techniques may compute the power spectral density of a signal. Fractal and wavelet-based techniques may also be employed. Moreover, for pairs of signals, cross spectral density or coherence techniques may be used to compute the "sameness" of the two signals.

Exemplary Flow Classification Processing

Classification of signatures (e.g., as in act 330) is generally understood by those skilled in the signal processing arts. Various techniques are known to classify a certain signature into one or more different classes. Generally, these techniques involve training or otherwise developing a number of known signatures, against which a candidate signature will be compared. Candidate signatures may be compared against a set of known signatures, and probabilities or other measures of "sameness" with various known signatures may be generated. Alternately, binary decisions may be made (i.e., matches or does not) based on a boundary between different signatures in a particular signature-space.

Using a periodogram, a signal generated from a tap 120/220 may be used to determine a number of data flows on a wired or wireless network. From the periodicity information in such periodograms, a type of data flow (e.g., FTP, CBR, etc.) may be hypothesized. Such classification of flows may be aided by other knowledge, such as typical transmission periods of different types of flows.

Periodograms may exhibit the dominant frequencies/periods in a signal. One type of such a dominant period is the round-trip time of a signal flow (e.g., in a TCP flow, the time between sending a packet and receiving an acknowledgment of the packet from the destination node). Another type of dominant period may be the latency associated with a data flow. Certain types of data flows (i.e., applications) may have "characteristic" periods/frequencies associated with them (e.g., voice over IP, video data, sensor data, etc.). These characteristic periods may be inherent in the type of data flow (e.g., a continuous stream of data). To the extent that these characteristic periods/frequencies identify certain applications or types of data flows, these periods may be used as "signatures" of the applications for classification processing. Applications that are not directly observed may still be characterized, because of their influence on other data flows that are observed. Hence, using a minimal amount of information, such as the arrival times of chunks at a tap 120/220, different flows at the tap 120/220 may be detected and classified.

CONCLUSION

Methods and systems consistent with the principles of the invention may detect chunks of data and determine characteristics of the detected chunks. The characteristics may be encoded into one or more signals that are amenable to further processing.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

For example, other types and permutations of signal encoding not specifically illustrated in FIGS. 5A-5F are specifically contemplated. Those methods of encoding information into a signal that are explicitly described are illustrative of similar techniques for encoding data into a time-series signal.

Moreover, the acts in FIG. 3 need not be implemented in the order shown; nor do all of the acts need to be performed. Also, those acts which are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of acquiring information about communication among nodes in a network, comprising:
   intercepting chunks of data in the network by a tap located among the nodes in the network;
   directly obtaining first characteristic information about the intercepted chunks of data, the first characteristic information including times of arrival of the chunks of data at the tap and identifiers of source nodes that sent the chunks of data;
   recording the first characteristic information in a record;
   indirectly determining second characteristic information about the intercepted chunks of data based on at least some of the first characteristic information; and
   constructing, using one of a plurality of encoding schemes based on at least one of a recorded amount of the first characteristic information or a usability of the first characteristic information in subsequent signal processing, at least one signal to represent the first and second characteristic information over time.

2. The method of claim 1, where the first characteristic information further includes at least one of durations of the chunks of data or identifiers of destination nodes to which the chunks of data are addressed, and the second characteristic data includes a type of the chunks of data.

3. The method of claim 1, where the network is a wireless network, and the tap is capable of intercepting wireless communications.

4. The method of claim 1, where the network is a wired network, and the tap is capable of intercepting communications on the wired network.

5. The method of claim 1, where the constructing includes:
   encoding one signal that includes the times of arrival of the chunks of data and the identifiers of the source nodes.

6. The method of claim 5, where the encoding includes:
   assigning phase information to data associated with the times of arrival of the chunks of data based on the identifiers of the source nodes.

7. The method of claim 6, where the phase information is a sign of the data associated with the times of arrival when there are two different source nodes identified by the identifiers of the source nodes.

8. The method of claim 1, where the constructing includes:
   encoding a plurality of signals using the identifiers of source nodes so that each one of the plurality of signals includes the times of arrival of the chunks of data sent by a single source node.

9. The method of claim 8, where the plurality of signals each consists of the times of arrival of the chunks of data sent by a single source node.

10. The method of claim 1, further comprising:
    re-sampling the at least one signal so that the first characteristic information is sampled at uniform periods of time.

11. The method of claim 1, further comprising:
    processing the at least one signal to obtain periodicity information about the at least one signal.

12. The method of claim 1, where the at least one signal includes a plurality of signals, and the method further comprises:
    processing the plurality of signals to obtain similarity information about pairs of the plurality of signals.

13. A method of acquiring information about communication among nodes in a network, comprising:
    passively observing chunks of data in the network by a tap located among the nodes in the network;
    obtaining characteristic information about the chunks of data, the characteristic information including a number of different types of information, including times of arrival of the chunks of data at the tap and durations of the chunks of data; and
    constructing, using one of a plurality of encoding schemes based on at least one of the number of different types of the information or a usability of the characteristic information in subsequent signal processing, at least one signal to represent the characteristic information over time.

14. The method of claim 13, where the characteristic information further includes at least one of identifiers of source nodes that sent the chunks of data or identifiers of destination nodes to which the chunks of data are addressed.

15. The method of claim 13, where the network is a wireless network, and the tap is capable of observing wireless communications.

16. The method of claim 13, where the network is a wired network, and the tap is capable of observing communications on the wired network.

17. The method of claim 13, where the characteristic information further includes identifiers of source nodes that sent the chunks of data, and
    where the constructing includes:
    encoding one signal that includes the times of arrival of the chunks of data and the durations of the chunks of data for all of the source nodes corresponding to the identifiers.

18. The method of claim 13, where the characteristic information further includes identifiers of source nodes that sent the chunks of data, and
    where the constructing includes:
    encoding a plurality of signals using the identifiers of source nodes so that each one of the plurality of signals includes the times of arrival of the chunks of data and the durations of the chunks of data sent by a single one of the source nodes.

19. The method of claim 13, where the constructing includes:
    encoding the durations of the chunks of data as amplitudes of data within the at least one signal.

20. The method of claim 13, where the constructing includes:
    encoding the durations of the chunks of data as lengths of data within the at least one signal.

21. The method of claim 13, further comprising:
    re-sampling the at least one signal so that the characteristic information is sampled at uniform periods of time.

22. The method of claim 13, further comprising:
    processing the at least one signal to obtain periodicity information about the at least one signal.

23. A method of acquiring information about communication among nodes in a network, comprising:
    intercepting chunks of data in the network by a tap located among the nodes in the network;
    obtaining characteristic information about the intercepted chunks of data, the characteristic information including times of arrival of the chunks of data at the tap, durations of the chunks of data, and identifiers of source nodes that sent the chunks of data;
    inferring a type of the chunks of data based on at least some of the characteristic information; and
    encoding the type of the chunks of data and the characteristic information as pulses of at least one signal, where the type of the chunks of data or the characteristic information is encoded as amplitudes of data with the at least one signal.

24. The method of claim 23, where the constructing includes:
  encoding the times of arrival of the chunks as impulses or pulses.

25. The method of claim 24, where the encoding includes:
  assigning a sign to the impulses or pulses based on which source node sent the chunks.

26. The method of claim 23, where the characteristic information further includes identifiers of destination nodes to which the chunks of data are addressed.

27. A computer-readable storage device that stores instructions executable by one or more processors to perform a method for acquiring information about communication in a network, comprising:
  instructions for detecting chunks of data in the network by a tap located among the nodes in the network;
  instructions for obtaining times of arrival of the chunks of data at the tap;
  instructions for obtaining identifiers of source nodes that sent the chunks of data;
  instructions for determining a type of the chunks of data based on at least some of the obtained times of arrival and identifiers of source nodes; and
  instructions for constructing at least one signal to represent the type of the chunks of data, the times of arrival of the chunks of data, and the identifiers of source nodes, over time.

28. The computer-readable storage device of claim 27, where the instructions for constructing include:
  instructions for encoding a one dimensional signal that includes the times of arrival of the chunks of data and the identifiers of the source nodes.

29. The computer-readable storage device of claim 27, where the instructions for constructing include:
  instructions for encoding a plurality of signals using the identifiers of source nodes so that each one of the plurality of signals includes the times of arrival of the chunks of data sent by a single source node.

30. A communication tap in a network, comprising:
  means for detecting chunks of data in the network;
  means for determining time of arrival information for the chunks of data;
  means for determining sizes of the chunks of data;
  means for determining types of the chunks of data based on the determined time of arrival information for the chunks of data and the determined sizes of the chunks of data; and
  means for constructing at least one signal to represent the types of the chunks of data, the times of arrival of the chunks of data and the sizes of the chunks of data over time.

* * * * *

UNITED STATES PATENT AND TRADEMARK OFFICE
CERTIFICATE OF CORRECTION

PATENT NO.       : 7,574,597 B1
APPLICATION NO. : 10/212324
DATED            : August 11, 2009
INVENTOR(S)      : Cousins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1988 days.

Signed and Sealed this

Seventh Day of September, 2010

David J. Kappos
*Director of the United States Patent and Trademark Office*